Figure 1:
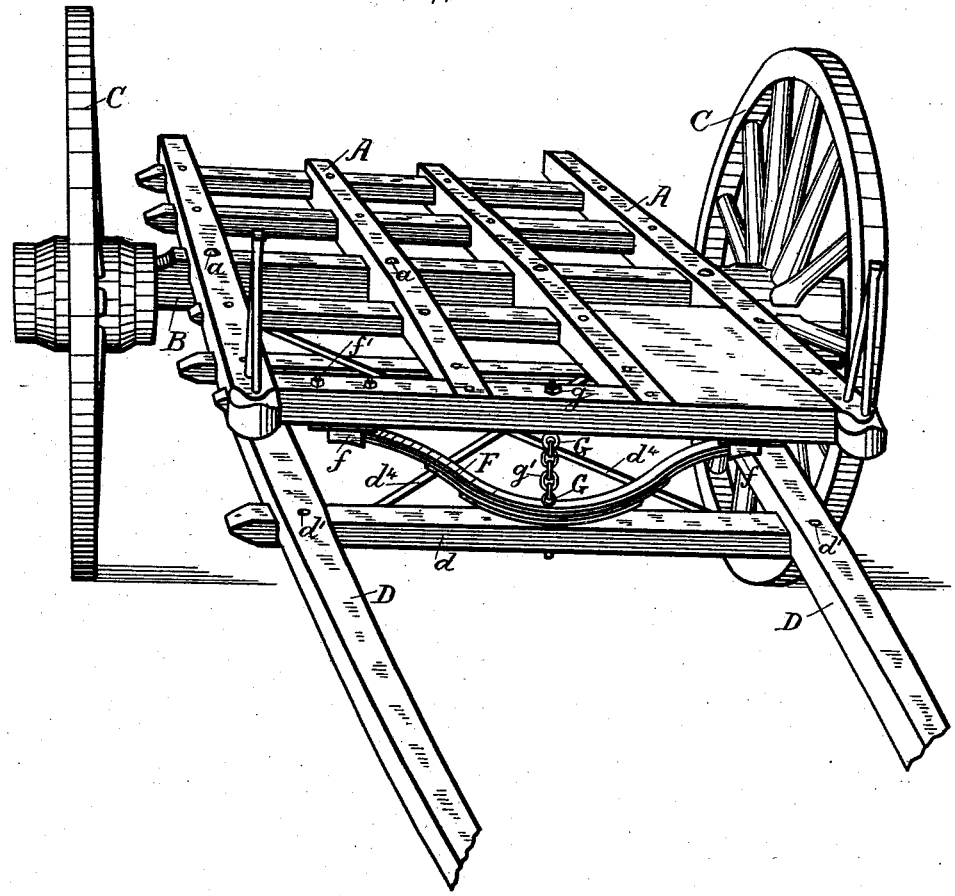

(No Model.) 2 Sheets—Sheet 1.

P. V. McBRIDE.
TRUCK.

No. 347,186. Patented Aug. 10, 1886.

WITNESSES:
Walter Allen
V. W. Middleton

INVENTOR
P. V. McBride.
BY
Herbert W. T. Jenner.
ATTORNEY (No Model.) 2 Sheets—Sheet 2.
P. V. McBRIDE.
TRUCK.
No. 347,186. Patented Aug. 10, 1886.
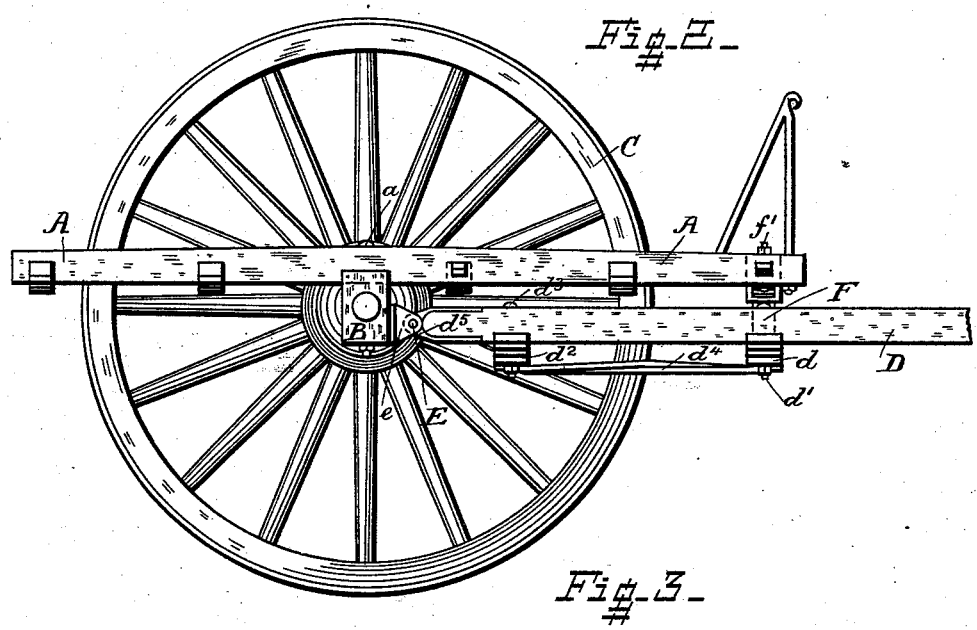
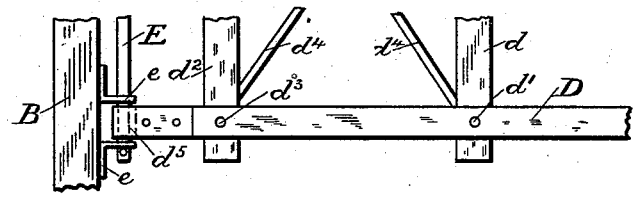
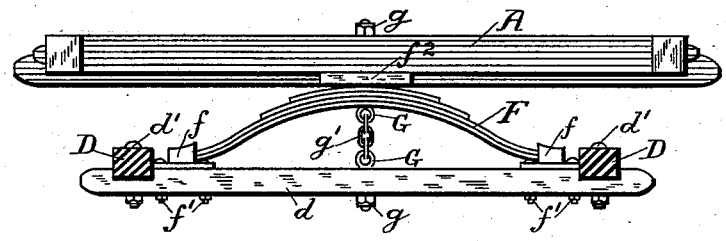
WITNESSES:
Walter Allen
V. W. Middleton
INVENTOR
P. V. McBride.
BY
Herbert W. T. Jenner.
ATTORNEY

UNITED STATES PATENT OFFICE.

PATRICK V. McBRIDE, OF CHARLESTON, SOUTH CAROLINA.

TRUCK.

SPECIFICATION forming part of Letters Patent No. 347,186, dated August 10, 1886.

Application filed November 23, 1885. Serial No. 183,733. (No model.)

*To all whom it may concern:*

Be it known that I, PATRICK V. MCBRIDE, a citizen of the United States, residing at Charleston, in the county of Charleston and State of South Carolina, have invented certain new and useful Improvements in Trucks; and I hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to trucks and other vehicles which are mounted upon two wheels and provided with shafts, between which a horse or other animal may be harnessed.

The invention consists in the detailed construction and combination of the parts hereinafter fully described and claimed, whereby the horse or other animal is relieved from the jerks and jars to which it would otherwise be subjected when the truck is drawn over rough and uneven ground. For this purpose a spring is provided and placed between the front end of the truck and the shafts, which are pivoted to the axle or framing of the truck at one end, so that the said spring may be free to vibrate. The weight of the truck-platform and the load upon it is distributed over three points—namely, the two truck-wheels and the back of the animal harnessed between the shafts. When the truck is drawn over rough ground, all the jerks and jars due to that portion of the weight supported by the animal are absorbed by the flexibility of the spring at the front end of the truck, and the animal is thereby enabled to perform more work with greater comfort and less fatigue.

In the drawings, Figure 1 is a front view, in perspective, of a truck constructed according to this invention, showing the shafts broken off. Fig. 2 is a side view of the same with one of the wheels removed. Fig. 3 is a detail plan view from above, showing how the shafts are connected to the axle. Fig. 4 is a front view of portions of the vehicle, with the shafts in section, showing a modification in the manner of attaching the spring.

Similar letters of reference indicate corresponding parts in all the figures.

A is the frame-work or platform upon which the load is placed. This platform is secured firmly to the axle B by bolts $a$.

C are wheels mounted upon the ends of axle B, in the usual manner.

D are the shafts between which the horse or other animal is harnessed. $d$ is a cross-bar secured to the said shafts by bolts $d'$ underneath the front end of the truck-platform. A similar cross-bar, $d^2$, is also secured to the ends of the shafts underneath the platform by bolts $d^3$. $d^4$ are cross-braces, which also unite the shafts together and form a rigid frame-work, together with the cross-bars $d$ and $d^2$. An eye, $d^5$, is provided at the end of each of the shafts. E is a pin which passes through each of the said eyes and through the brackets $e$, which are bolted to the truck-axle.

F is an elliptical spring placed between the front end of the platform A and the cross-bar $d$ of the shafts. $f$ are shoes secured to the under side of the said platform by bolts $f'$, for keeping the ends of the spring F in position.

G are eyebolts provided with screwed ends and nuts $g$. One of these bolts passes through the spring F and the cross-bar $d$, and secures them firmly together. The other eyebolt passes through the front end of the platform A, directly above the first bolt. A short chain, $g'$, connects the eyes of the two bolts G together and prevents the platform of the truck from tilting over backward.

I sometimes prefer to apply the spring F as shown in Fig. 4. In this case the shoes $f$ are bolted to the cross-bar $d$ and the spring is secured to the front end of the platform. If desired, a distance-piece, $f^2$, may be placed between the said spring and the platform, to reduce the curvature of the spring.

The truck, as above described, can be used for heavy or light weights with equal facility.

The invention is applicable to two-wheeled vehicles, carts, and wagons of every description, and also to the frame-work of four-wheeled vehicles, which can be changed so as to run upon two wheels.

Having thus described my invention, what I claim as new, and desire to secure by Letters Patent, is—

1. A two-wheeled vehicle provided with a platform and with shafts free to vibrate vertically with respect to the said platform, in combination with a spring provided with a check-chain secured between the front end of the said platform and the said shafts, substantially as and for the purpose set forth.

2. A two-wheeled vehicle provided with a platform and with shafts free to vibrate vertically with respect to the said platform, in combination with an elliptical spring provided with a check-chain secured between the front end of the said platform and the said shafts, substantially as and for the purpose set forth.

3. The combination of an axle provided with running wheels, a platform secured to the said axle, shafts pivotally connected to the said axle, a spring secured between the front end of the platform and the said shafts, and a chain connecting the front end of the platform with the shafts, substantially as and for the purpose set forth.

4. The combination of an axle provided with running wheels, a platform secured to the said axle, the shafts D, provided with the cross-bar $d$ and pivotally connected to the said axle, an elliptical spring secured between the front end of the platform and the said cross-bar of the shafts, the eyebolts G, and the chain $g'$, connecting the front end of the platform with the shafts, substantially as and for the purpose set forth.

5. The combination of an axle provided with running wheels, a platform secured to the said axle, the shafts D, provided with cross-bars $d$ and $d^2$, cross-braces $d^4$, and eyes $d^5$, the pin E and brackets $e$, for securing the said shafts to the axle, the elliptical spring F, provided with shoes $f$, the eyebolts G, and the chain $g'$, substantially as and for the purpose set forth.

In testimony whereof I affix my signature in presence of two witnesses.

PATRICK V. McBRIDE.

Witnesses:
 T. MOULTRIE MORDECAI,
 LOUIS T. BACOT.